UNITED STATES PATENT OFFICE.

ALFRED MONNIER, OF PHILADELPHIA, PENNSYLVANIA.

IMPROVEMENT IN SEPARATING METALS FROM A MIXTURE OF METALLIC AND ALKALINE SULPHATES.

Specification forming part of Letters Patent No. 121,798, dated December 12, 1871.

*To all whom it may concern:*

Be it known that I, ALFRED MONNIER, of Philadelphia, in the State of Pennsylvania, have invented a new and useful Process for the Separation of the Metals from a Mixture of Metallic and Alkaline Sulphates, of which process the following is a specification:

My invention is designed to facilitate the separation of metallic sulphates, such as the sulphate of iron, copper, cobalt, or nickel, from the alkaline sulphates, such as the sulphate of potassa or soda, and the obtaining of the metals from the metallic sulphates, as oxides, or partly in a metallic state and partly in a state of oxide, by the use of carbon, such as charcoal, stone-coal, bituminous coal, or their equivalents, with or without inert substances, such as quartz or stone, or their equivalents.

I proceed as follows, to wit: To a mixture of sulphates, such, for example, as the sulphate of copper and sulphate of soda obtained by crystallization or evaporation to dryness, I add stone-coal or its equivalent in small pieces of about the size of pea-coal, and in quantity about one-half the quantity of sulphate. I then calcine this mixture in an ordinary reverberatory furnace, stirring the mixture from time to time and keeping it at a low red heat until all the sulphate of copper is decomposed. This is ascertained by taking from the furnace at short intervals a sample and mixing it with water, and then testing this solution for copper in the usual way. If copper is found the calcination is continued; but if no copper remains the charge is ready to be removed from the furnace. I obtain nearly the same results by using sand, or, preferably, broken quartz or stone of about pea-coal size, in place of carbon; but in this case the oxide produced is very impure. I therefore prefer the use of carbon alone, as above described, rather than the use of sand or stone, or a mixture of both carbon and sand or stone.

The calcined mixture is next lixiviated, by which the undecomposed sulphate of soda is dissolved, the insoluble residue containing the copper as metallic copper, and partly as oxidule, ($CU^2O$,) and the coal. The copper is readily separated from the coal by washing, and the sulphate of soda recovered by evaporation.

I claim—

The treatment of mixed metallic and alkaline sulphates for the purpose of separating them, substantially as described.

ALFRED MONNIER.

Witnesses:
 CHAS. PARHAM.
 THOS. A. BURTT.

(35)